United States Patent
Menick et al.

(10) Patent No.: US 12,541,680 B2
(45) Date of Patent: Feb. 3, 2026

(54) REDUCED COMPUTATION REAL TIME RECURRENT LEARNING

(71) Applicant: GDM Holding LLC, Mountain View, CA (US)

(72) Inventors: Jacob Lee Menick, London (GB); Erich Konrad Elsen, San Francisco, CA (US); Karen Simonyan, London (GB)

(73) Assignee: GDM Holding LLC, Mountain View, CA (US)

( * ) Notice: Subject to any disclaimer, the term of this patent is extended or adjusted under 35 U.S.C. 154(b) by 938 days.

(21) Appl. No.: 17/169,083

(22) Filed: Feb. 5, 2021

(65) Prior Publication Data

US 2021/0256375 A1    Aug. 19, 2021

Related U.S. Application Data

(60) Provisional application No. 62/971,566, filed on Feb. 7, 2020.

(51) Int. Cl.
| | |
|---|---|
| G06N 3/044 | (2023.01) |
| G06N 3/063 | (2023.01) |
| G06N 3/08 | (2023.01) |
| G06N 3/082 | (2023.01) |
| G06N 3/084 | (2023.01) |

(52) U.S. Cl.
CPC .............. G06N 3/08 (2013.01); G06N 3/044 (2023.01)

(58) Field of Classification Search
CPC .................................. G06N 3/08; G06N 3/044
See application file for complete search history.

(56) References Cited

U.S. PATENT DOCUMENTS

| | | | |
|---|---|---|---|
| 2017/0140265 A1* | 5/2017 | Le | G06N 3/044 |
| 2018/0260703 A1* | 9/2018 | Soljacic | G06N 3/084 |

OTHER PUBLICATIONS

Wand, Xiaozhe, Janusz W.Bialek, Konstantin Turitsyn, "PMU-Based Estimation of Dynamic State Jacobian Matrix and Dynamic System State Matrix in Ambient Conditions", Jan. 1, 2018, IEEE, p. 682 and 687 (Year: 2018).*
Wang, Xiaozhe, Janusz W.Bialek, Konstantin Turitsyn, "PMU-Based Estimation of Dynamic State Jacobian Matrix and Dynamic System State Matrix in Ambient Conditions", Jan. 1, 2018, IEEE, p. 682 and 687 (Year: 2018).*
Li, Phen, Hongzhi Su, Chengshan Wang, Zhelin Liu, and Jianzhong Wu, "PMU-Based Estimation of Voltage-to-Power Sensitivity for Distribution Networks Considering the Sparsity of Jacobian Matrix", May 28, 2018, pp. 31308-31310 (Year: 2018).*
Narang, Sharan, Erich Elsen, Greg Diamos, Shubho Sengupta, "Exploring Sparsity in Recurrent Neural Networks", 2017, pp. 3-4 and 8 (Year: 2017).*
Liu, Baoyuan, Min Wang, Hassan Foroosh, Marshall Tappen, Marianna Pensky, "Sparse Convolutional Neural Networks", p. 810 (Year: 2015).*

(Continued)

*Primary Examiner* — Shahid K Khan
*Assistant Examiner* — Skylar K Vanwormer
(74) *Attorney, Agent, or Firm* — Fish & Richardson P.C.

(57) ABSTRACT

A computer-implemented method for training a recurrent neural network using forward propagation rather than back propagation through time. The method is particularly suited to training sparse recurrent neural networks, and may be implemented on specialized hardware.

17 Claims, 6 Drawing Sheets

(56) References Cited

OTHER PUBLICATIONS

Griewank, Andreas, Jean Utke and Andrea Walther, "Evaluating Higher Derivative Tensors by Forward Propagation of Univariate Taylor Series", 2000, American Mathematical Society (Year: 2000).*
Bellec et al., "Biologically inspired alternatives to backpropagation through time for learning in recurrent neural nets," arXiv preprint arXiv:1901.09049, Jan. 2019, 37 pages.
Chen et al., "The best of both worlds: Combining recent advances in neural machine translation." arXiv preprint arXiv:1804.09849, Apr. 2018, 12 pages.
Chen et al., "Training deep nets with sublinear memory cost," arXiv preprint arXiv:1604.06174, Apr. 2016, 12 pages.
Cho et al., "Learning phrase representations using RNN encoder-decoder for statistical machine translation," arXiv preprint arXiv:1406.1078, Jun. 2014, 15 pages.
Clark et al., "Adversarial video generation on complex datasets," arXiv preprint arXiv:1907.06571, Jul. 2019, 21 pages.
Cooijmans et al., "On the variance of unbiased online recurrent optimization," arXiv preprint arXiv:1902.02405, Feb. 2019, 37 pages.
Espeholt et al., "Impala: Scalable distributed deep-rl with importance weighted actor-learner architectures," International Conference on Machine Learning, Jul. 2018, 10 pages.
Gale et al., "The state of sparsity in deep neural networks," arXiv preprint arXiv:1902.09574, Feb. 2019, 15 pages.
Graves et al., "Hybrid computing using a neural network with dynamic external memory," Nature, Oct. 2016, 538(7626):471-6.
Griewank et al., "Algorithm 799: revolve: an implementation of check pointing for the reverse or adjoint mode of computational differentiation," ACM Transactions on Mathematical Software (TOMS), Mar. 2000, 26(1):19-45.
Gruslys et al., "Memory-efficient backpropagation through time," arXiv preprint arXiv:1606.03401, Jun. 2016, 14 pages.

Hochreiter et al., "Long short-term memory," Neural computation, Nov. 1997, 9(8):1735-80.
Itti et al., "A model of saliency-based visual attention for rapid scene analysis," IEEE Transactions on pattern analysis and machine intelligence, Nov. 1998, 20(11):1254-9.
Jaderberg et al., "Human-levelperformance in 3D multiplayer games with population-based reinforcement learning," Science, May 2019, 364(6443):859-65.
Jaeger et al., "The "echo state" approach to analyzing and training recurrent neural networks-with an erratum note," German National Research Center for Information Technology GMD Technical Report, Jan. 2001, 47 pages.
Kalchbrenner et al., Efficient neural audio synthesis, International Conference on Machine Learning, Jul. 2018, 10 pages.
Merity et al., "Pointer sentinel mixture models," arXiv preprint arXiv:1609.07843, Sep. 2016, 13 pages.
Mujika et al., "Approximating real-time recurrent learning with random kronecker factors," Advances in Neural Information Processing Systems, 2018, 31:6594-603.
Murray et al., "Local online learning in recurrent networks with random feedback," Elife, May 2019, 25 pages.
Stackman et al., "The synaptic organization of the brain. fifth edition. edited by Gordon M Shepherd," The Quarterly Review of Biology, Dec. 2005, 80(4):502-502.
Tallec et al., "Unbiased online recurrent optimization," arXiv preprint arXiv:1702.05043, Feb. 2017, 14 pages.
Wayne et al., "Unsupervised predictive memory in a goal-directed agent," arXiv preprint arXiv:1803.10760, Mar. 2018, 57 pages.
Werbos et al., "Generalization of backpropagation with application to a recurrent gas market model," Neural Networks, Jan. 1988, 1(4):339-56.
Williams et al., "A learning algorithm for continually running fully recurrent neural networks," Neural Computation, Jun. 1989, 1(2):270-80.

* cited by examiner

REDUCED COMPUTATION REAL TIME RECURRENT LEARNING

CROSS-REFERENCE TO RELATED APPLICATION

This application claims priority to U.S. Provisional Application No. 62/971,566, filed on Feb. 7, 2020. The disclosure of the prior application is considered part of and is incorporated by reference in the disclosure of this application.

BACKGROUND

This specification relates to training recurrent neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network maintains an internal hidden state and can use some or all of the internal hidden state of the network from a previous time step in computing an output at a current time step.

An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network. Another example of a recurrent neural network is a GRU (gated recurrent unit), which also maintains a cell state but has a simpler structure and combines the input gate and forget gate into an update gate.

SUMMARY

This specification describes a computer-implemented method for training a recurrent neural network using forward propagation rather than back propagation through time. The method is particularly but not exclusively suited to training sparse recurrent neural networks, and may be implemented on specialized hardware.

In one aspect there is described a computer-implemented method of training a recurrent neural network using forward propagation, the recurrent neural network having a plurality of network parameters, e.g., weights and/or biases. The method may comprise receiving training data at each of a sequence of time steps, and for a succession, e.g., each of the time steps, determining, using the training data, a gradient of an optimization function with respect to the network parameters from a Jacobian matrix for the time step. The Jacobian matrix for the time step may define a derivative of a current hidden state of the recurrent neural network with respect to the network parameters.

The method may further comprise adjusting the network parameters ($\theta$) dependent on the gradient of the optimization, e.g., loss, function (e.g.

$$\frac{\partial L_t}{\partial \theta_t}$$

), for example according to $$\theta \leftarrow \theta - \eta \frac{\partial L_t}{\partial \theta_t}$$

where $\eta$ is a learning rate. The optimization function may depend on a difference between a predicted output derived from the recurrent neural network for the training data, and a target output.

Determining the Jacobian matrix for the time step may comprises determining a dynamics Jacobian matrix for the time step defining a derivative of a current hidden state of the recurrent neural network with respect to a previous hidden state (for example, the immediately previous hidden state) of the recurrent neural network (for example if the current and previous hidden state each have k elements the dynamics Jacobian matrix may be a k×k matrix $D_t$), and determining a product of the dynamics Jacobian matrix for the time step and the Jacobian matrix for a previous time step. The method may then comprise imposing sparsity on the product and determining the Jacobian matrix for the time step based on the product, In implementations, imposing sparsity on the product to determine the Jacobian matrix for the time step may involve setting a proportion of the elements of the Jacobian matrix for the previous time step to zero. As described later, the Jacobian matrix on which the (additional) sparsity is imposed may be one which already represents a sparse recurrent neural network, e.g., a dense version of a sparse Jacobian matrix representing the sparse recurrent neural network.

In general in a recurrent neural network, because of the recurrence each of the hidden units (neurons) may be influenced by many or all of the network parameters over a long time scale. However only one hidden unit may be directly influenced by a network parameter, and over a small number of recurrence time steps only a few hidden units may be indirectly influenced. Thus the computational load can be reduced without significantly impacting the performance of the recurrent neural network, by limiting the elements of the Jacobian matrix for the time step used in a gradient update computation. In practice, because of the typical size of the Jacobian matrix, this can reduce the memory and particularly compute requirements by orders of magnitude.

In some implementations imposing sparsity on the Jacobian matrix comprises applying a sparsity mask to the Jacobian matrix for the previous time step. The sparsity mask may identify elements of the Jacobian matrix for the previous time step to be set to zero, e.g., it may define elements allowed to be non-zero. The matrix product may then be used to define the Jacobian matrix for the time step. In this way the sparsity mask may be re-imposed each time the Jacobian matrix for a time step is calculated. The sparsity mask may be chosen according to the number of time steps over which the influence of a network parameter on the value (output) of a hidden unit is allowed to propagate. The sparsity mask may define a proportion of Jacobian matrix elements allowed to be non-zero of, e.g., less than 50%, 20%, 10%, 5%, 2%, or 1%. Determining the product of the dynamics Jacobian matrix for the time step and the Jacobian matrix for the previous time step may thus comprise performing a sparse matrix multiply.

In implementations elements of the Jacobian matrix for the time step may each define a derivative of a dimension of the current hidden state with respect to one of the network parameters. The Jacobian matrix may have at least one entry in each row and column of the matrix.

The sparsity matrix may identify as permitted to be non-zero, i.e., as not defined as set to zero, (only) elements of the Jacobian matrix for the previous time step corresponding to hidden state units or dimensions which are directly affected by one of the network parameters, i.e., affected by one of the network parameters in a single iteration of processing by the recurrent neural network.

Alternatively the sparsity matrix may identify as non-zero (only) elements of the Jacobian matrix for the previous time step corresponding to hidden state units which are affected by one of the network parameters after no more than two, or in general N, forward iterations of processing by the recurrent neural network. Each recurrent iteration typically involves updating the hidden state according to a function defined by the network parameters, and optionally stored memory. An element of the Jacobian matrix may be identified by a hidden state unit (dimension) and a network parameter. The sparsity matrix may identify an element as permitted to be non-zero if after no more than N iterations a value of the hidden state unit (dimension) is influenced by the corresponding network parameter of the Jacobian matrix.

Put differently, a hidden state of the recurrent neural network is defined by a plurality of hidden state variables. The sparsity mask may be configured to retain terms of the masked matrix product which correspond to a combination of a hidden state variable and a network parameter which directly influences a value of the hidden state variable for the time step. Alternatively the sparsity mask may be configured to retain sets of two-step terms in the masked matrix product, where a set of two-step terms comprises, for each particular unit, the terms which send input directly to the particular unit from the previous time step.

Also or instead, imposing sparsity on the product for a time step may comprise retaining only elements of the product for the time step which have one of the top M values of the elements. In some implementations M is determined by a dimension of the hidden state (e.g., number of hidden units); for example M=k, or some multiple or fraction of k. Here elements of the Jacobian matrix for the time step each define a derivative of a dimension of the current hidden state with respect to one of the network parameters.

Determining the Jacobian matrix for a time step may further comprise adding a (sparse) immediate Jacobian matrix for the time step to the product of the dynamics Jacobian matrix for the time step and the Jacobian matrix for the previous time step. This may be done before or after imposing sparsity on the product. The immediate Jacobian matrix for the time step may comprise elements which each define a derivative of a dimension of the current hidden state with respect to a current value of one of the network parameters (later $$I_t = \frac{\partial h_t}{\partial \theta_t}$$

).

Elements of the Jacobian matrix for the time step may each define a derivative of a dimension of the current hidden state with respect to one of the network parameters. The sparsity mask may identify as non-zero elements of the Jacobian matrix for the previous time step corresponding to hidden state units which are affected by one of the network parameters in a single iteration of processing by the recurrent neural network, and the sparsity mask may retain an element of the Jacobian matrix for the previous time step $J_{t-1}$ only if the corresponding element in the immediate Jacobian matrix is non-zero.

Determining the gradient of the optimization function with respect to the network parameters may involve determining a product of the Jacobian matrix for the time step and a gradient of the optimization function with respect to the current hidden state of the recurrent neural network (e.g., $$\frac{\partial L_t}{\partial h_t}$$

).

In implementations the dynamics Jacobian matrix may be sparse matrix, e.g., with a sparsity of greater than 50%. The method may involve forming the Jacobian matrix for each time step to exclude rows or columns with zero value. A row or column with zero value may be defined by the (sparse) dynamics Jacobian matrix.

Some implementations of the method may be configured for implementation on dense matrix multiply-accumulate hardware or a dense matrix processing systolic array. The recurrent neural network may be a sparse recurrent neural network, e.g., in the sense that a parameter matrix with elements defining for each dimension of the current hidden state, the network parameters directly influencing the dimensions (i.e., in a single time step), is a sparse matrix with a sparsity of 90% or more. Then method may use a dense version of the Jacobian matrix for the time step, i.e., a version of the Jacobian matrix for the time step in which columns or rows of all zero values are removed. The method may use sparse matrix multiply hardware to determine the product of the dynamics Jacobian matrix for the time step and the Jacobian matrix for a previous time step.

There is also contemplated a method of implementing Real Time Recurrent Learning (RTRL) training of a sparse recurrent neural network in tensor processing hardware. The method may comprise receiving the training data in a first processor, and using the tensor processing hardware to determine a gradient of an optimization function as previously described by controlling the tensor processing hardware to determine the matrix product of the dynamics Jacobian matrix for the time step and the Jacobian matrix for the previous time step, and to re-impose sparsity on the product. Further features of such a method may be as previously described.

Another aspect of the present disclosure provides computer-implemented method of training a recurrent neural network using forward propagation, the recurrent neural network having a plurality of network parameters. The method comprises: receiving training data at each of a sequence of time steps and, for a succession of, e.g., for each of, the time steps: determining, using the training data, a gradient of an optimization function with respect to the network parameters from a Jacobian matrix for the time step, wherein the Jacobian matrix for the time step defines a gradient of a current hidden state of the recurrent neural network with respect to the network parameters; and adjusting the network parameters dependent on the gradient of the optimization function. Determining the Jacobian matrix for the time step comprises: determining a dynamics Jacobian matrix for the time step, defining a derivative of a current hidden state of the recurrent neural network with respect to a previous hidden state of the recurrent neural network; determining a product of the dynamics Jacobian matrix for the time step and the Jacobian matrix for a previous time step, and imposing sparsity on the product to determine the Jacobian matrix for the time step. In this aspect imposing sparsity on the Jacobian matrix for the time step may comprise applying a sparsity mask to the product to determine a masked matrix product, wherein the sparsity mask identifies elements of the Jacobian matrix for the time step to be set to zero, and wherein the masked matrix product defines the Jacobian matrix for the time step. The sparsity mask may identify as non-zero elements of the Jacobian matrix for the time step corresponding to hidden state units which are affected by one of the network parameters in a single iteration of processing by the recurrent neural network. Alternatively, the sparsity mask may identify as non-zero elements of the Jacobian matrix for the time step corresponding to hidden state units which are affected by one of the network parameters after no more than two, or in general after N, iterations of processing by the recurrent neural network.

Another aspect provides one or more computer storage media, which may be non-transitory storage media, storing instructions that when executed by one or more computers cause the one or more computers to implement a method according to any aspect or implementation described herein. A further aspect provides a system comprising one or more computers and one or more storage devices storing instructions that when executed by the one or more computers cause the one or more computers to perform operations to implement a method according to any aspect or implementation described herein.

A method of training as described herein may be used to train a recurrent neural network to process training data such as audio, image or video data in order to perform a range of tasks. For example image data may be processed as sequential data representing a sequence of pixels defining a raster pattern over the image, or for video across multiple image frames. In another example a complete image frame may be processed in a time step (in which case the hidden state may characterize a history of image frames); each time step may then define a frame of video data. In another example data processed by the recurrent neural network may comprise audio data such as a time sequence of digitized audio samples in the time and/or frequency domain, e.g., representing speech. In another example data processed by the recurrent neural network may comprise a sequence of phonemes, graphemes, word pieces or words of a natural language. In another example data processed by the recurrent neural network may comprise a sequence of medical data, e.g., a time series of observations of one or more bodily characteristics of a patient. In another example data processed by the recurrent neural network may comprise a sequence of observations from one or more sensors of a robot, vehicle, mechanical agent, or manufacturing process. In some implementations sequences of data from more than one type of data source may be combined.

A method as described herein may be used may be used to train a recurrent neural network operating on its own or as part of some larger system, for example as part of an end-to-end training process of a neural network system in which the recurrent neural network is incorporated. Such a recurrent neural network or system may be trained to perform tasks such as: converting sequential input data to sequential output data, i.e., interconverting between any of the previously described data types, e.g., for speech recognition (audio in, natural language out), speech generation (natural language in, audio out), machine translation (audio and/or natural language in and out). Other tasks include: generating example data items of a similar type to the training data, e.g., audio or image/video data, e.g., for predicting a future content of the audio or image/video (or sensor data) data for planning purposes, e.g., in reinforcement learning; classifying data items of the types previously described, e.g., to identify one or more objects or items in an image, video, or speech; processing image/video or speech, e.g., to modify a quality or content of the image/video or speech, or to improve a quality of the image/video or speech; compressing or decompressing image/video or speech data; and reasoning over image/video, speech, natural language, or other data, e.g., to answer questions about the data.

The subject matter described in this specification can be implemented in particular embodiments so as to realize one or more of the following advantages.

Conventionally a recurrent neural network is trained by back propagation through time, but this involves memorizing a historical sequence of internal hidden states so the entire state history must be stored, meaning that the memory cost grows linearly with the sequence length. For sequences too long to fit in memory, the use of Truncated BPTT (TBPTT) has been proposed. Unfortunately the truncation length used by TBPTT also limits the duration over which temporal structure can be reliably learned. By contrast training using forward propagation such as real time recurrent learning (RTRL) does not require memorizing hidden states, but RTRL is computationally intractable for all but the smallest networks. Implementations of the techniques described herein can reduce both the memory and computation requirements of training a recurrent neural network using forward propagation by orders of magnitude compared to some conventional techniques.

Thus a recurrent neural network trained as described herein can be trained faster, and may provide improved overall performance, e.g., increased accuracy, compared with other techniques. Sparse recurrent neural networks appear able to provide better performance than dense recurrent neural networks with the same number of parameters, and the techniques described herein are particularly suitable for training sparse recurrent neural networks. Some implementations of the techniques are also suitable for specialized hardware.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the drawings indicate like elements.

DETAILED DESCRIPTION

Recurrent neural networks generate, for a current time step, an output that is informed by other outputs generated for one or more previous time steps. Some recurrent neural networks employ gated activation units. Such recurrent neural networks may be referred to as gated recurrent neural networks. Gated activation units maintain a type of memory by implementing functions that control how much information generated in a previous time step should be remembered and how much should be forgotten. Common gated activation units include Long Short Term Memory units (LSTM units), Gated Recurrent Units (GRUs), several variants thereof.

In general, a gated activation unit updates a current hidden state using at least the previous hidden state and a current input. Updating the hidden state generally involves one or more linear transformations and one or more nonlinear activations. Each linear transformation can use a weight matrix and a bias vector. Training a gated recurrent neural network thus involves learning the weight matrices and bias vectors for each gated activation unit.

Figure 1:
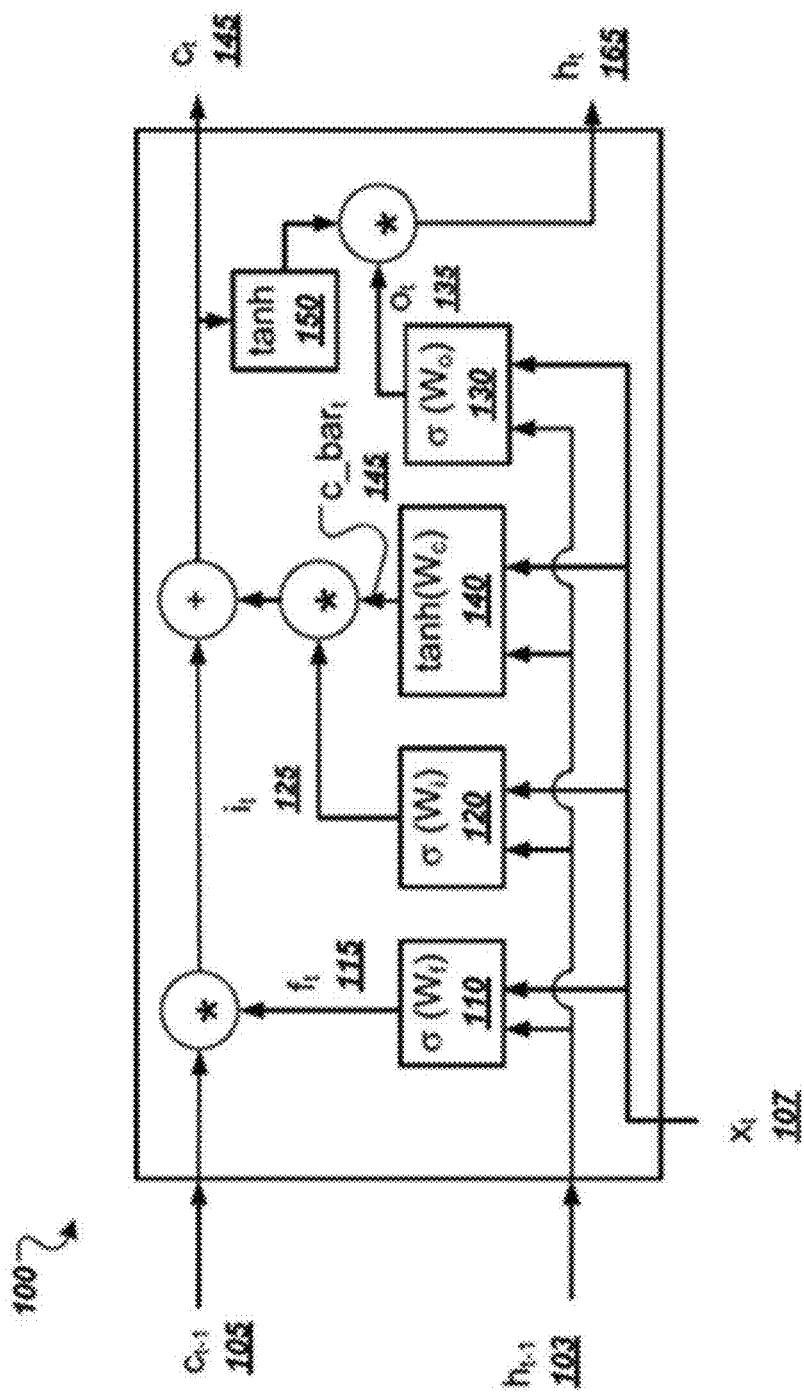
FIG. 1 illustrates a prior art LSTM unit.

FIG. 1 illustrates a prior art LSTM unit 100. The LSTM unit 100 maintains both a hidden state, $h_t$, as well as a cell state, ct. The LSTM unit 100 implements a forget gate, which determines how much of the previous hidden state to forget; and an input gate, which determines which values of the cell state to update, and an output gate, which determines which values to output.

The operations of the LSTM unit 100 can be defined by the following equations, in which the previous hidden state $h_{t-1}$ corresponds to $h_{t-t}$ 103, a previous cell state $c_{t-1}$ corresponds to $c_{t-1}$ 105, and the current input $x_t$ corresponds to $x_t$ 107. In this context, "*" refers to pointwise multiplication, "+" refers to pointwise addition, and "$f$" is a sigmoid activation function. The notation "$W_x[h_{t-1}, x_t]$" refers to matrix multiplication of a matrix $W_x$ by a vector of $h_{t-1}$ concatenated with $x_t$. Some literature splits each matrix $W_x$ into two matrices, W and U, in which case W is multiplied with $h_{t-1}$ and U is multiplied by $x_t$.

$$f_t = f\ (W_f[h_{t-1}, x_t] + b_f) \qquad (1)$$

$$i_t = f\ (W_i[h_{t-1}, x_t] + b_i) \qquad (2)$$

$$o_t = f\ (W_o[h_{t-1}, x_t] + b_o) \qquad (3)$$

$$c\_bar_t = \tanh(W_c[h_{t-1}, x_t] + b_c) \qquad (4)$$

$$c_t = f_t * c_{t-1} + i_t * c\_bar_t \qquad (5)$$

$$h_t = o_t * \tanh(c_t) \qquad (6)$$

The forget gate 110 corresponds to Equation (1) and generates $f_t$ 115; an input gate 120 corresponds to Equation (2) and generates $i_t$ 125; and an output gate 130 corresponds to Equation (3) and generates $o_t$ 135. A tanh layer 140 corresponds to Equation (4) and generates a vector of candidates $c\_bar_t$ 145 for adding to the current cell state. A current cell state $c_t$ 155 is given by Equation (5). A last tanh layer 150 uses the computed cell state $c_t$ 155 to generate the current hidden state $h_t$ 165 according to Equation (6).

Each of Equations (1), (2), (3), and (4) specifies performing a matrix operation between a respective weight matrix $W_n$ for the corresponding layer and the current input vectors $x_t$ and $h_{t-1}$. The result is then added to a respective bias vector $b_n$ to the result. The result of these calculations is then fed through nonlinear activation functions $f$ and tanh to generate a final output vector $h_t$ for time step t.

Figure 2:
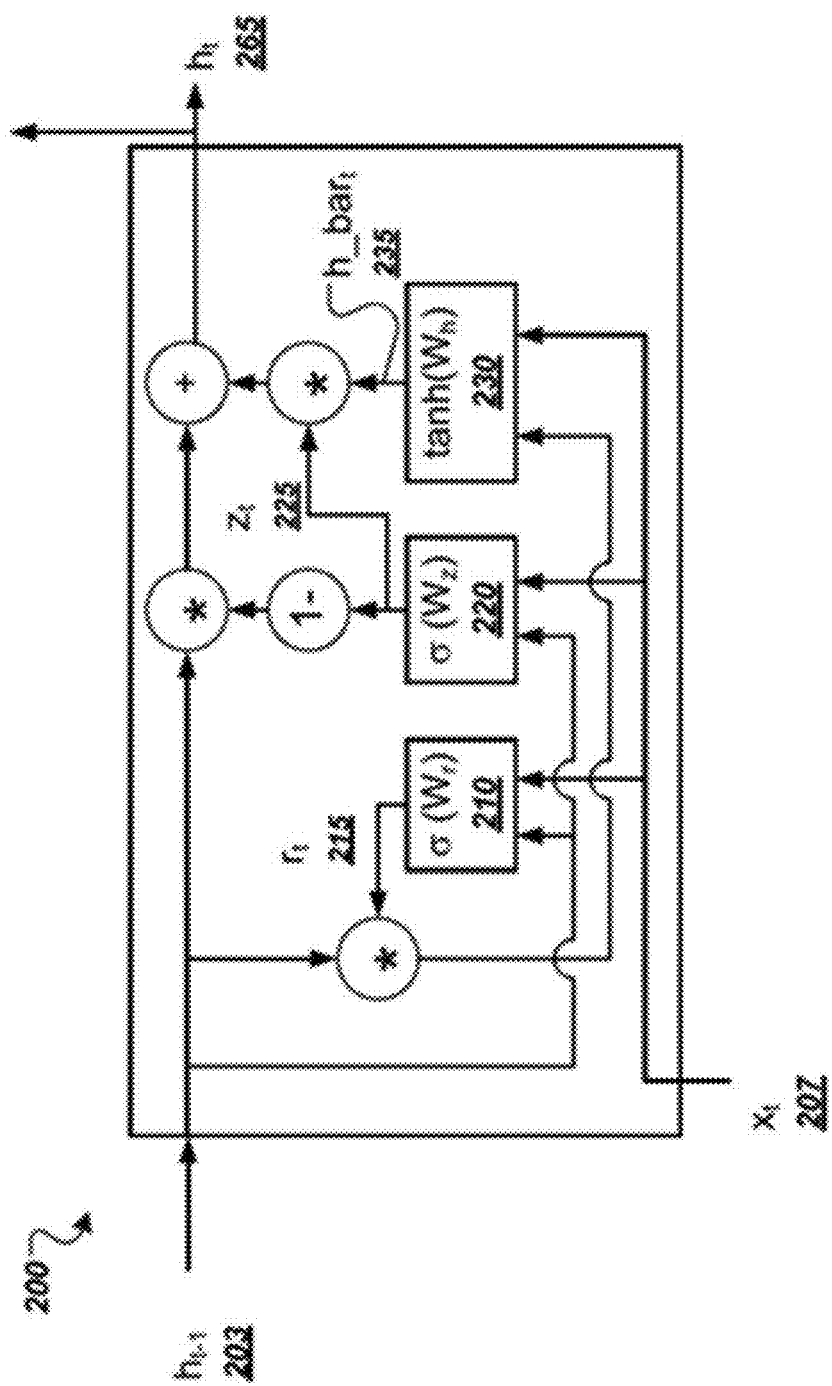
FIG. 2 illustrates a prior art gated recurrent unit (GRU).

FIG. 2 illustrates a prior art gated recurrent unit (GRU) 200. A main difference between the GRU 200 and the LSTM unit 100 is that the GRU 200 effectively merges the LSTM cell state and hidden state into just a hidden state. Therefore, the GRU 200 receives as input a previous hidden state and outputs only a current hidden state for a given input $x_t$.

The operations of the GRU 200 are generally defined by the following equations, in which the previous hidden state $h_{t-1}$ corresponds to $h_{t-1}$ 203 and the current input xx corresponds to $x_t$ 207.

$$z_t = f\ (W_z[h_{t-1}, x_t] + b_z) \qquad (7)$$

$$r_t = f\ (W_r[h_{t-1}, x_t] + b_r) \qquad (8)$$

$$h\_bar_t = \tanh(W_h[r_t * h_{t-1}, x_t] + b_h) \qquad (9)$$

$$h_t = (1 - z_t) * h_{t-1} + z_t * h\_bar_t \qquad (10)$$

A reset gate 210 corresponds to Equation (8) and generates $r_t$ 215. An update gate 220 corresponds to Equation (7) and generates $z_t$ 225. A tanh layer 230 corresponds to Equation (9) and generates $h\_bar_t$ 235. The final hidden state $h_t$ 265 is then computed according to Equation (10).

As can be seen, the GRU 200 is somewhat simpler than the LSTM unit 100 in that it implements fewer gates and activation functions. But like the LSTM 100, the GRU 200 also uses a number of matrix operations using a weight matrix $W_n$ and a current input $x_t$, and a respective bias vector $b_n$ is then added to the result. The result of these calculations is also then fed through respective nonlinear activation functions $f$ or tanh.

As problems that exhibit long-term temporal structure are being confronted, scaling up the capacity of RNNs and training them on long sequences is desirable. Existing methods for training RNNs are, however, limited in this regard. A known technique of training RNNs, Backpropagation Through Time (BPTT), must cache the entire history of hidden state values of the RNN during the window of time over which gradients are computed when implemented naively. Whilst there are techniques for mitigating this problem it is still not possible to scale training to arbitrarily long sequences, as would be required by a continual learning agent operating on the single trajectory of experience comprising its lifetime.

Real Time Recurrent Learning (RTRL) can train RNNs fully online without backtracking, enabling gradient computation over arbitrarily long sequences with the fixed memory requirements of maintaining a single fixed-size state variable and updating it at every time step. This size of the object that needs to be stored for this purpose is O(kp) where k is the state size of the RNN and p is the number of parameters in the RNN cell. Storing even one copy of this object is challenging for realistically sized RNNs. Updating it is even more expensive, with a cost of O($k^2$p).

A RNN may be a "sparse" RNN or a "dense" RNN, where a "sparse" RNN is one in which many of the entries in θ (the network parameters) are zero. It has been found that, for a constant parameter and flop budget, sparser RNNs may have more capacity per parameter that a denser RNN. This suggests that training large sparse RNNs could yield powerful sequence models, but the memory required to store the history of (now much larger) states required for training using BPTT becomes prohibitive for long sequences.

This specification considers, as an example, recurrent networks whose dynamics are governed by $h_t = f_\theta(h_{t-1}, x_t)$ where $h_t \in \mathbb{R}^k$ is the state, $x_t \in \mathbb{R}^\alpha$ is an input, and $\theta \in \mathbb{R}^p$ are the network parameters. At each step $t \in \{1, \ldots, T\}$, the state is mapped to an output $y_t = g_\phi(h_t)$, and the network receives a loss $\mathcal{L}_t(y_t)$. The system optimizes the total loss $\mathcal{L} = \Sigma_t \mathcal{L}_t$ with respect to parameters by following the gradient $\nabla_\theta \mathcal{L}$.

RTRL computes the gradient as:

$$\nabla_\theta \mathcal{L} = \sum_{t=1}^{T} \frac{\partial \mathcal{L}_t}{\partial h_t} \frac{\partial h_t}{\partial \theta} = \sum_{t=1}^{T} \frac{\partial \mathcal{L}_t}{\partial h_t} \left( \frac{\partial h_t}{\partial \theta} + \frac{\partial h_t}{\partial h_{t-1}} \frac{\partial h_{t-1}}{\partial \theta} \right) \quad (11)$$

This can be viewed as an iterative algorithm, updating $$\frac{\partial h_t}{\partial \theta}$$

from the intermediate quantity $$\frac{\partial h_{t-1}}{\partial \theta}.$$

To simplify equation (11) the following notation is introduced:

$$J_t := \frac{\partial h_t}{\partial \theta}, I_t := \frac{\partial h_t}{\partial \theta_t} \text{ and } D_t := \frac{\partial h_t}{\partial h_{t-1}}.$$

J stands for "Jacobian", I for "immediate Jacobian", and D for "dynamics Jacobian". J may also be referred to as the "influence matrix". Then the recursion can be written (as also illustrated in FIGS. 4(a)-(e) in which the left image represents $I_t$, the middle image represents $D_t$ and the right image represents $J_{t-1}$, and x indicates a standard dense matrix multiplication):

$$J_t = I_t + D_t J_{t-1} \quad (12)$$

$J_t$ is a matrix in $\mathbb{R}^{k \times |\theta|}$, which can be on the order of gigabytes for even modestly sized RNNs. Furthermore, performing the operation $D_t J_{t-1}$ involves multiplying a k×k matrix by a k×|θ| matrix each timestep. That requires |θ| times more computation than the forward pass of the RNN core. To make explicit just how expensive RTRL is, this is a factor of roughly one million for a classic RNN with 1000 hidden units.

In analogy to Truncated BPTT, it has been proposed to perform a gradient update partway through a training sequence (at time t) but still passing forward a stale state and a stale influence Jacobian $J_t$ rather than resetting both to zero after the update. This enables more frequent weight updating at the cost of a staleness bias. The Jacobian becomes "stale" because it tracks the sensitivity of the state to old parameters. This trade-off can be favorable toward more frequent updates. However, much of the work on RTRL assumes that the parameters are updated at every time step t (known as fully online") and the Jacobian is never reset, at least until the start of a new sequence.

Aspects of the described techniques relate to a new sparse approximation for RTRL. The algorithm tracks only the influence of a parameter of the RNN cell on other cells that are affected by it within N steps of the RNN. The cost of the algorithm is controlled by N and by the amount of sparsity in the Jacobian of the RNN cell-thus, a larger value of N can be coupled with increased sparsity to keep the cost of the algorithm fixed. The approximation approaches full RTL as N increases.

This specification describes an approximation to RTRL called the "Sparse N-Step Approximation" (SnAp) which reduces substantially the computational requirements for RTRL.

In outline, the SnAp approximation imposes sparsity on the Jacobian J even though it is in general dense (where "dense" means that few of the entries in J are non-zero.) This may be done by applying a sparsity pattern, or sparsity mask, to the Jacobian. The sparsity pattern or mask is chosen to be the locations that are non-zero after N steps of the RNN.

Figure 3:
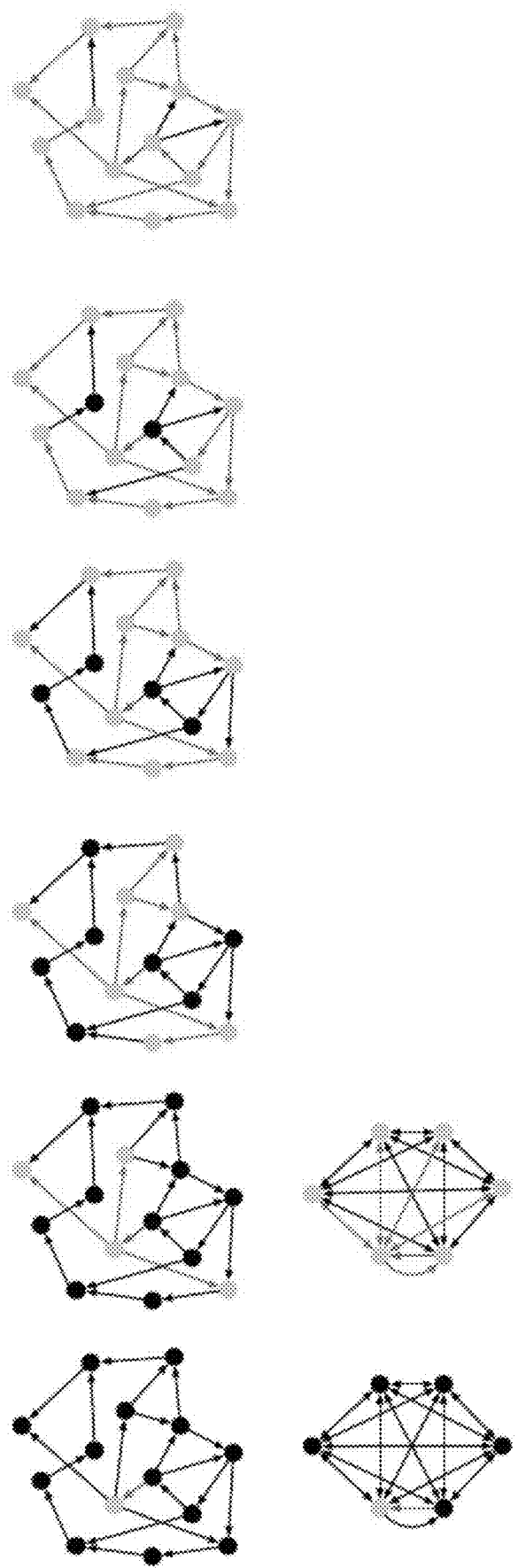
FIG. 3 illustrates operation of a sparse N-step approximation (SnAp) to real time recurrent learning (RTRL) in dense (bottom) and sparse (top) graphs.

Locations that are non-zero after N steps of the RNN are illustrated in FIG. 3, which shows the effect of the SnAp approximation in dense (bottom) and sparse (top) graphs. Initially, in the left hand view one node (shown as light) is activated via a connection i from another node. As the figure proceeds to the right (corresponding to stepping through time) the influence of this connection propagates through the graph as connections from the activated node cause further nodes to be activated. At each step nodes are shown as light if they have been influenced on or before that step, and are shown as dark otherwise. A sparsity pattern may be imposed on J by retaining the entry $J_{i,j}$ if node j is coloured light (non-zero), but setting all other entries in row i to zero.

In the case of the dense network the initial connection i influences all nodes in the network when N≥2, as shown in the lower part of FIG. 3.

In a some implementations the same sparsity pattern is used for all steps, though this is not a requirement. This means that the sparsity pattern of $J_t$—and so of $J_{t-1}$—is known and can be used to reduce the amount of computation required to determine the product $D_t J_{t-1}$ by applying a sparsity mask or pattern to $J_{t-1}$ to reduce the number of non-zero entries in $J_{t-1}$ that are involved in the determination of the product $D_t J_{t-1}$. An alternative strategy for performing SnAp-1 and SnAp-2 would be to perform the full multiplication of $D_t J_{t-1}$ and then only keep the top-k values. This would reduce the bias of the approximation but increase its cost.

More formally, the following approximation for all values of t may be adopted:

$$(J_t)_{ij} \approx \begin{cases} (J_t)_{ij} & \text{if } (\theta_i)_j \text{ influences hidden unit } (h_{t+n})_i \\ 0 & \text{otherwise} \end{cases}$$

Figure 4:
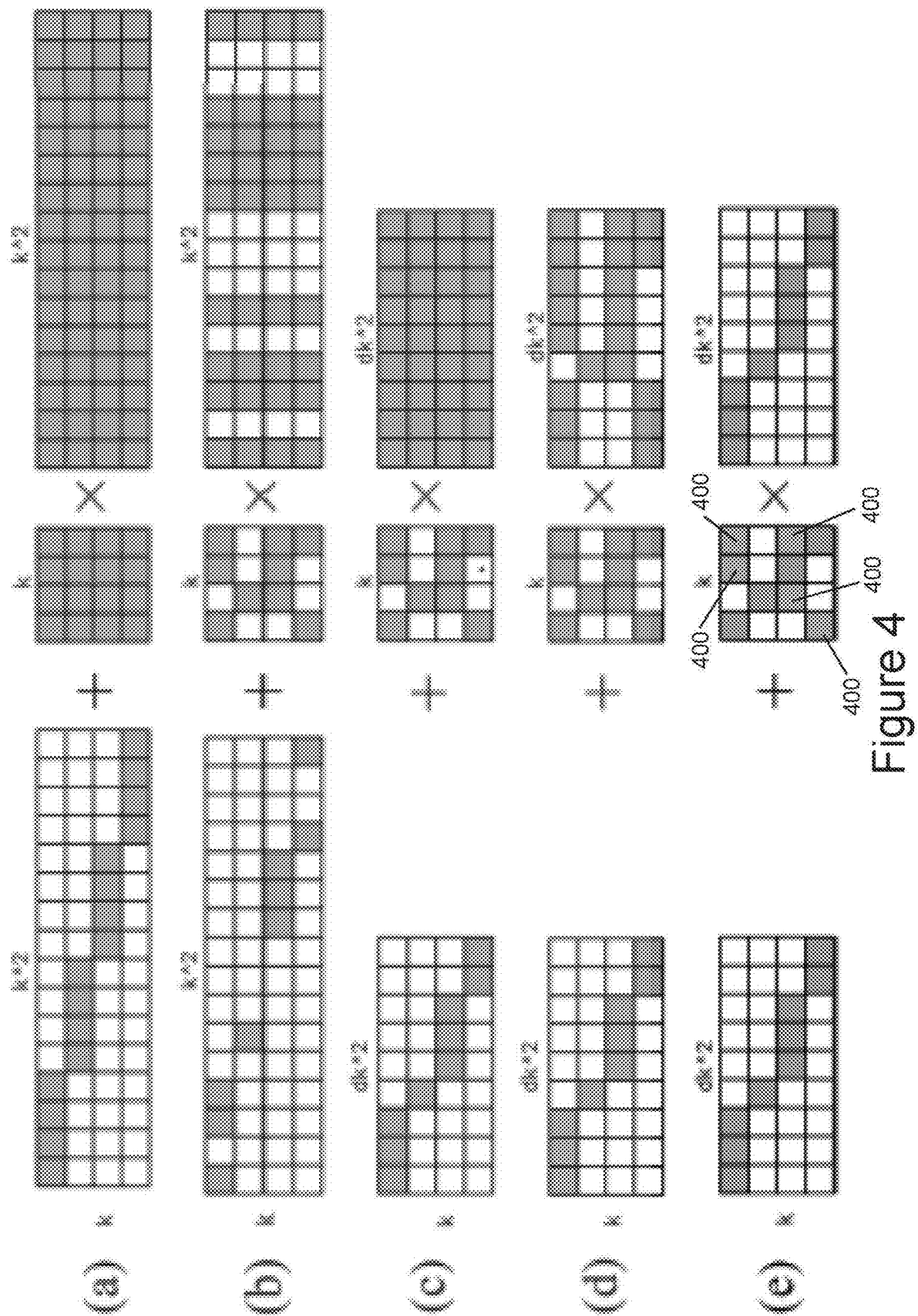
FIGS. 4(*a*) to 4(*e*) are schematic illustrations of determining a Jacobian ($J_t = I_t + D_t J_{t-1}$).

FIGS. 4(a)-(e) are visualizations of a process of determining $J_t = I_t + D_t J_{t-1}$. In each of FIGS. 4(a)-(e), the left pattern corresponds to $I_t$, the middle pattern corresponds to $D_t$, and the right pattern corresponds to $J_{t-1}$. In the patterns, white squares denote zero entries. FIG. 4(a) illustrates the process using RTRL, and it can be seen that each entry in $D_t$ and $J_{t-1}$ is non-zero. FIG. 4(b) illustrates the process using sparse RTRL, in which some non-zero entries of FIG. 4(a) have been set to zero so that both $D_t$ and $J_{t-1}$ include some columns in which every element is zero (white). FIG. 4(c) illustrates the use of $\tilde{J}_t = \tilde{I}_t + D_t \tilde{J}_{t-1}$, where $\tilde{I}_t$ and $\tilde{J}_t$ are obtained by extracting the columns of $I_t$ and $J_t$ that contain non-zero elements as described below. FIGS. 4(d) and 4(e) respectively illustrate the SnAp-2 and SnAp-1 approximations described herein, in which a sparsity mask or pattern has been applied to $J_{t-1}$ to make further elements non-zero.

While $D_t$ in FIG. 4(d) and $D_t$ in FIG. 4(e) have the same number of non-zero elements, not all the non-zero elements in $D_t$ in FIG. 4(e) need be used in determining $J_t$ (elements 400 are the non-zero, not used elements).

The computational costs of the methods of RTRL, sparse RTRL, SnAp-1 and SnAp-2 and BPTT are compared in Table 1.

TABLE 1

| Method | Memory | Time per step |
|---|---|---|
| RTRL | k + kp | $k^2 + k^2p$ |
| Sparse RTRL | k + dkp | $d(k^2 + dk^2p)$ |
| SnAp-1 | k + dp | $d(k^2 + p)$ |
| SnAp-2 | $k + d^2 kp$ | $d(k^2 + d^2k^2p)$ |
| BPTT | Tk + p | $k^2 + p$ |

In Table 1, T denotes the sequence length, k denotes the number of hidden units of the RNN, p denotes the number of recurrent parameters, and d=1−s, where the sparsity s is the proportion of elements that are non-zero.

Examples of ways in which sparsity may be imposed on the product $D_t J_{t-1}$ are now described by way of illustration.

Sparse One-Step Approximation (SnAp-1)

Even for a fully dense RNN, each parameter will usually immediately influence only the single hidden unit it is directly connected. This means that the immediate Jacobian $I_t$ tends to be extremely sparse. For example, a classic (or "vanilla") RNN will have only one nonzero element per column, which is a sparsity level of (k−1)/k. Storing only the nonzero elements of $I_t$ saves a significant amount of memory without making any approximations. $I_t$ is the same shape as the $J_t$ matrix whereas the nonzero values are the same size as θ. The immediate Jacobian $I_t$ can become more dense in architectures such as GRU and LSTM.

In the Sparse One-Step Approximation, entries in $J_{t-1}$ are kept only if they are nonzero in $I_t$ as shown in FIG. 4(e). That is, elements of the Jacobian matrix for the previous time step are retained if they correspond to hidden state units which are affected by one of the network parameters in a single iteration of processing by the recurrent neural network (that is a retained element in the Jacobian matrix for the previous time step corresponds to a combination of a hidden state unit and a parameter that affects that hidden state unit in a single time step).

SnAp-1 is effectively diagonal, in the sense that the effect of parameter j on hidden unit i is maintained through time, but ignoring the indirect effect of parameter j on hidden unit i via paths through other units i'. More formally, one can define u(j) as the one component in the state $h_t$ that is connected directly to the parameter j (which has at the other end of the connection some other entry i' within $h_{t-1}$ or $x_t$. Let I=u(j). The imposition of the one-step sparsity pattern means only the entry in row i will be kept for column j in $J_t$. Inspecting the update for this particular entry, $$(J_t)_{ij} = (I_t)_{ij} + \sum_{m=1}^{n}(D_t)_{im}(J_{t-1})_{mj} = (I_t)_{ij} + (D_t)_{ii}(J_{t-1})_{ij} \quad (13)$$

This equality follows from the assumption that $(J_{t-1})_{mj}=0$ if m≠j.

Optimizations for Full RTRL with Sparse Networks

When the RNN is sparse, the costs of even full (un-approximated) RTRL can be alleviated to a surprising extent, and it is possible to save computation proportional to a factor of the sparsity squared. I_t is assumed that proportion s of the entries in both θ and $D_t$ are equal to zero, and the quantity s is defined as the sparsity in the RNN. For convenience, the "density" of the RNN is defined as d=1−s. With a classic RNN, this correspondence between parameter sparsity and dynamics sparsity holds exactly, although for gating architectures such as GRU and LSTM the relationship is more complicated More complex recurrent architectures involving attention would require an independent mechanism for inducing sparsity in $D_t$. However it is generally assumed in the following description that sparsity in θ corresponds to sparsity in $D_t$.

If the sparsity level of θ is s, then so is the sparsity in J because the columns corresponding to parameters which are clamped to zero have no effect on the gradient computation. The columns of J that contain non-zero parameters may be extracted into a new dense matrix $\tilde{J}_t$ for use everywhere with no effect on the gradient computation. Similarly, the columns of I that contain non-zero parameters may be extracted into a new dense matrix $\tilde{I}_t$, so that the update rule becomes:

$$\tilde{J}_t = \tilde{I}_t + D_t \tilde{J}_{t-1}$$

These optimizations taken together reduce the storage requirements by 1/d (because $\tilde{J}_t$ is d times the size of J) and the computational requirements by $1/d^2$ because $D_t$ in the sparse matrix multiplication $D_t \tilde{J}_t-1$ has density d, saving an extra factor of 1/d.

Sparse N-Step Approximation (SnAp-N)

In the Sparse One-Step Approximation, entries in $J_{t-1}$ are retained if they correspond to hidden state units which are affected by one of the network parameters in a single iteration of processing by the recurrent neural network. In the SnAp-2 approximation [SnAp-N approximation], entries in $J_{t-1}$ are retained if they correspond to hidden state units which are affected by one of the network parameters in two iterations [N iterations] of processing by the recurrent neural network (that is a retained element in the Jacobian matrix for the previous time step corresponds to a combination of a hidden state unit and a parameter that affects that hidden state unit in two time steps [N time steps]). SnAp-N for N>1 is both strictly less biased and strictly more computationally expensive (as can be seen by comparing FIG. 4(d) with FIG. 4(e), the Jacobian matrix for the previous time step in the SnAp-2 or SnAp-N approximation includes more non-zero entries than in the SnAp-1 approximation), but its computational costs can be reduced by increasing the degree of sparsity in the RNN.

SnAp-2 or SnAP-n may be used with sparse networks. As can be seen from the dense network in the lower part of FIG. 3, after just two RNN steps a given parameter has influenced every unit of the state through its intermediate influence on other units. Thus only SnAp with N=1 is efficient for a dense RNN, and SnAp with N>1 does not result in any sparsity in $J_t$ for a dense network. That is, for dense networks SnAp-2 reduces to full RTRL. For avoidance of doubt, SnAp-1 is also applicable to sparse networks. The computational cost of SnAp-2 is comparable with SnAp-1 if the sparsity of the RNN is increased so that $d<k^{-2/3}$, corresponding to a 99% or higher sparsity for a 1000-unit classic RNN.

Even when $D_t$ is sparse, the computation graph linking nodes (neurons) in the hidden state over time should still be connected, meaning that $\tilde{J}_t$ eventually becomes fully dense because after enough iterations every (non-zero) parameter will have influenced every hidden unit in the state. Thus, sparse approximation are available, and are required to obtain an efficient algorithm. For sparse RNNs, SnAp may be used to impose further sparsity on $\tilde{J}_t$ rather than $J_t$.

Jacobian Sparsity of GRUs and LSTMs

Unlike classic ("vanilla") RNNs whose dynamics Jacobian $D_t$ has sparsity exactly equal to the sparsity of the weight matrix, GRUs and LSTMs have inter-cell interactions which increase the Jacobians' density. In particular, the choice of GRU variant can have a very large impact on the density of the "dynamics" Jacobian $D_t$ and the parameter Jacobians $I_t$ and $J_t$. For the standard LSTM formulation given in equations 1 to 6 above, an individual parameter will directly affect only one entry in each gate (it, ft, ot) and the candidate cell c_bar$_t$. These in turn produce the next cell ct and next hidden state ht with element-wise operations. In this case, FIG. 1 is an accurate depiction of the propagation of influence of a parameter as the RNN is stepped.

However, for a GRU there are multiple formulations in which a parameter or hidden unit can influence many units of the next state. For the formulation in equations (7) to (10) above, the parameters influencing $r_t$ further influence every unit of hbar$_t$ because of the matrix multiplication in equation (9). They therefore influence every unit of $h_t$ within one recurrent step, which means that the dynamics Jacobian $D_t$ and the immediate parameter Jacobian $I_t$ are fully dense.

In an alternative formulation, equation (9) may be modified to move the reset gate to be after the matrix multiplication, thus avoiding the composition of parameterized linear maps within a single RNN step. The modeling performance of the two variants is largely the same, but the second variant is faster and results in sparser $D_t$ and $I_t$.

Figure 5A:
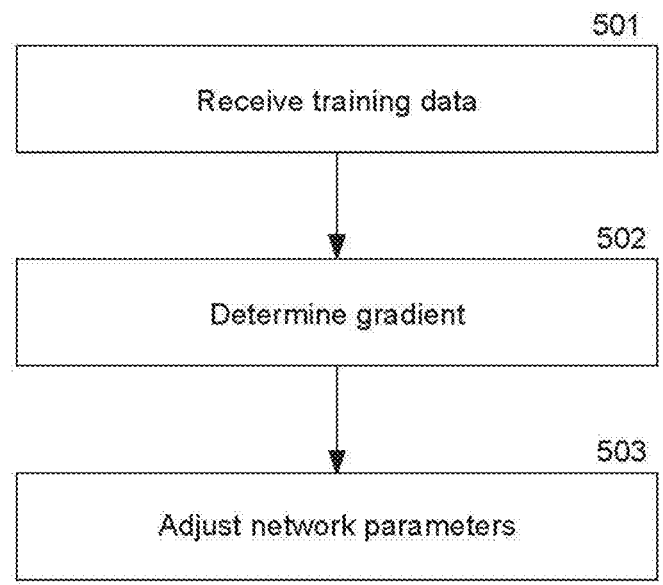
FIGS. 5(*a*) and 5(*b*) are flow diagrams of a process for training a recurrent neural network.

FIG. 5(a) is a flow diagram illustrating principal features of a method according to one implementation. At step 501 training data are received at each of a sequence of time steps. At step 502 a gradient of an optimization function with respect to the network parameters is determined, using the training data, from a Jacobian matrix for the time step. The Jacobian matrix for the time step defines a derivative of a current hidden state of the recurrent neural network with respect to the network parameters. The determination of the gradient at step 502 is carried out for a succession of the time steps. At step 503 the network parameters are adjusted dependent on the gradient of the optimization function. Steps 502 and 503 may be repeated until the gradient of an optimization function with respect to the network parameters falls to a value at which the network is considered to be trained.

Once the network is trained, it may be used to process input data, to perform tasks such as: converting sequential input data to sequential output data, i.e., interconverting between any of the previously described data types, e.g., for speech recognition (audio data in, natural language out), speech generation (natural language in, audio out), machine translation (audio and/or natural language in and out). Other tasks include: generating example data items of a similar type to the training data, e.g., audio or image/video data, e.g., for predicting a future content of the audio or image/video (or sensor data) data for planning purposes, e.g., in reinforcement learning; classifying data items of the types previously described, e.g., to identify one or more objects or items in an image, video, or speech; processing image/video or speech, e.g., to modify a quality or content of the image/video or speech, or to improve a quality of the image/video or speech; compressing or decompressing image/video or speech data; and reasoning over image/video, speech, natural language, or other data, e.g., to answer questions about the data.

Determining the gradient of the optimization function with respect to the network parameters from the Jacobian matrix for the time step may comprise determining a product of the Jacobian matrix for the time step and a gradient of the optimization function with respect to the current hidden state of the recurrent neural network.

Figure 5B:
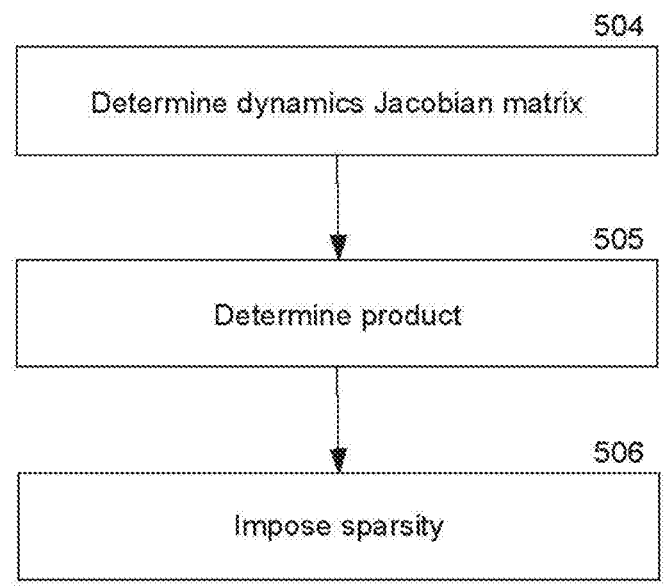

FIG. 5(b) is a flow diagram illustrating principal features of the determination of the Jacobian matrix for the time step $J_t$ for use in determining the gradient of the optimization function with respect to the network parameters. At step 504 a dynamics Jacobian matrix $D_t$ is determined for the time step. The dynamics Jacobian matrix $D_t$, defines a derivative of a current hidden state of the recurrent neural network with respect to a previous hidden state of the recurrent neural network. At step 505 a product of the dynamics Jacobian matrix $D_t$ and the Jacobian matrix for a previous time step $J_{t-1}$ is determined. Determination of the Jacobian matrix for the time step $J_t$ further includes imposing sparsity on the product $D_t J_{t-1}$ and this is indicated at step 506. The Jacobian matrix $J_t$ for the time step is then determined based on the masked matrix product. For example, in one implementation, determining the Jacobian matrix for the time step further comprises adding an immediate Jacobian matrix $I_t$ for the time step to the product $D_t J_{t-1}$ of the dynamics Jacobian matrix for the time step and the Jacobian matrix for the previous time step, where the immediate Jacobian matrix for the time step comprises elements which each define a derivative of a dimension of the current hidden state with respect to a current value of one of the network parameters.

Determining the product of the dynamics Jacobian matrix for the time step and the Jacobian matrix for the previous time step may be done using any suitable matrix multiplication technique. Where both the dynamics Jacobian matrix for the time step and the Jacobian matrix for the previous time step are sparse matrices, determining the product may use a sparse matrix multiplication technique to provide further computational savings.

Imposing sparsity on the product may be done by imposing sparsity on the Jacobian matrix for the previous time step, for example by applying a sparsity mask to the Jacobian matrix for the previous time step where the sparsity mask identifies elements of the Jacobian matrix for the previous time step to be set to zero. The product of the dynamics Jacobian matrix for the time step and the Jacobian matrix for the previous time step is then determined using the sparsified Jacobian matrix for the previous time step.

In this implementation the sparsity mask may identify as non-zero those elements of the Jacobian matrix for the previous time step that correspond to hidden state units which are affected by one of the network parameters in a single iteration of processing by the recurrent neural network. This is the SnAp-1 approximation implementation. In this implementation, as noted above and as shown in FIG. 4(e), the sparsity mask retains an element of $J_{t-1}$ only if the corresponding element in the immediate Jacobian matrix $I_t$ is non-zero.

The SnAp-1 approximation may be looked at another way. If a hidden state of the recurrent neural network is defined by a plurality of hidden state variables, the sparsity mask is configured to retain terms $(J_{t-1})_{ij}$ in the Jacobian for the previous time step which correspond to a combination of a hidden state variable (i) and a network parameter (j) which directly influences a value of the hidden state variable for the time step.

Alternatively, the sparsity mask may identify as non-zero those elements of the Jacobian matrix for the previous time step that correspond to hidden state units which are affected by one of the network parameters after no more than 2 iterations of processing by the recurrent neural network. This is the SnAp-2 approximation implementation.

The SnAp-2 approximation may again be looked at another way. If a hidden state of the recurrent neural network is defined by a plurality of hidden state variables, the sparsity mask is configured to retain sets of two-step terms in the Jacobian for the previous time step. A two-step term corresponds to a combination of a hidden state variable and a network parameter which influences a value of the hidden state variable for the second time step.

As a further alternative, the sparsity mask may identify as non-zero those elements of the Jacobian matrix for the previous time step that correspond to hidden state units which are affected by one of the network parameters after no more than N iterations of processing by the recurrent neural network, where N>2. This is the SnAp-N approximation implementation.

In a further implementation that is applicable to a sparse RNN, the Jacobian matrix for each time step may be formed to exclude rows or columns with zero value, where a row or column with zero value is defined by the sparse dynamics Jacobian matrix. Such a Jacobian is referred to as $\tilde{J}_t$, and determining the gradient of an optimization function with respect to the network parameter may be effected using the product multiplication $D_t\tilde{J}_{t-1}$. In the case of a sparse RNN the SnAp approximation techniques described herein may be used to impose additional sparsity on $\tilde{J}_{t-1}$ rather than on $J_{t-1}$.

In a yet further implementation, imposing sparsity on the product for the time step comprises retaining only elements of the product for the time step which have one of the top M values. The number M of values to be retained may be determined in any suitable way. For example, M may be determined based on a dimension of the hidden state (e.g., based on the number k of hidden units).

Figure 6:
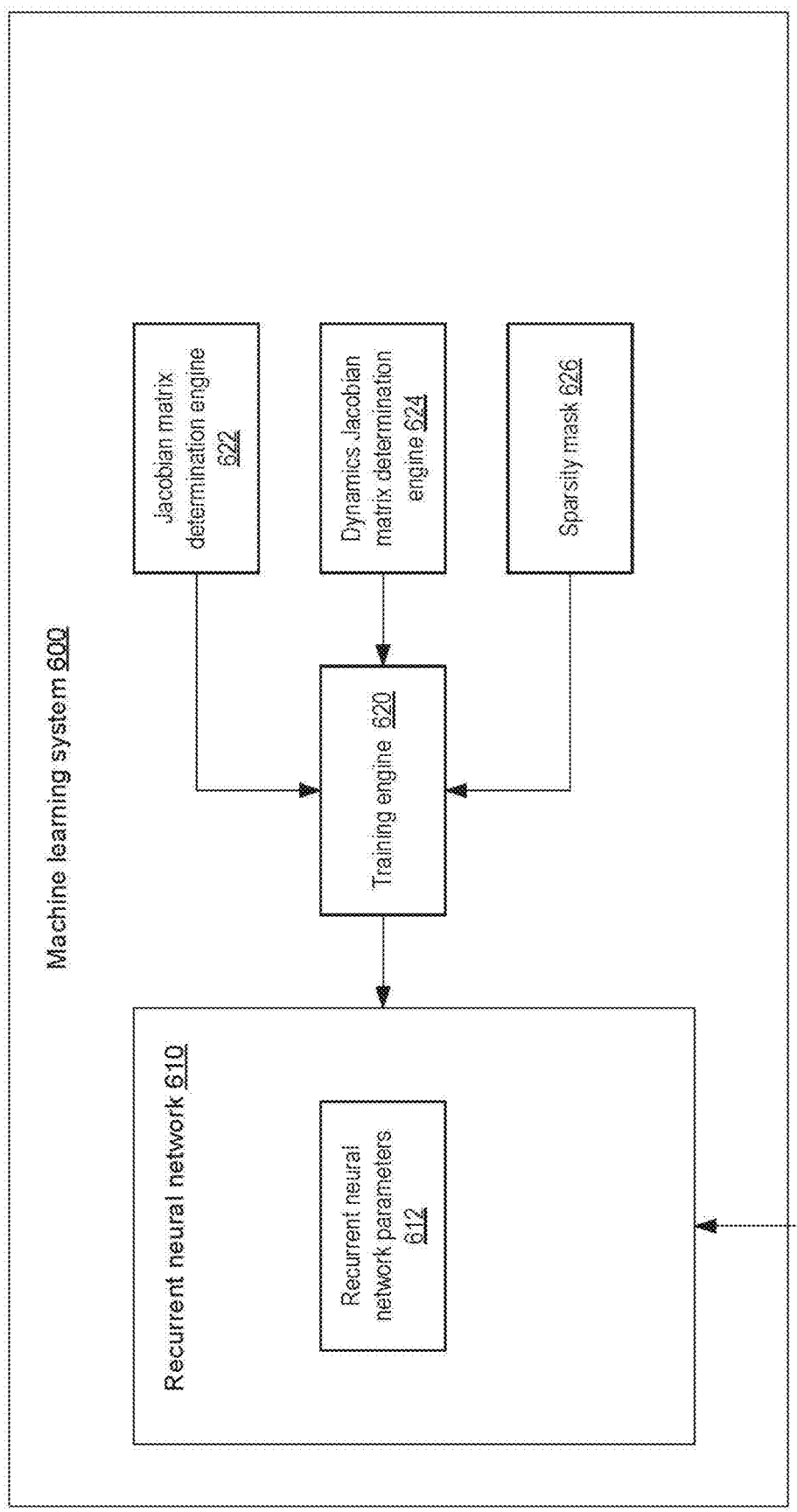
FIG. 6 shows a block diagram of a training system for a recurrent neural network.

FIG. 6 shows a machine learning system 600 for training a recurrent neural network 610 having a plurality of recurrent neural network parameters 612 using training data 630. The machine learning system includes a training engine 620 which has an input from a Jacobian matrix determination engine 622 configured to determine a Jacobian matrix, an input from a dynamics Jacobian matrix determination engine 624 configured to determine a dynamics Jacobian matrix, and an input to receive a sparsity mask 626. The training engine 620 is configured to implement a method as previously described, to thereby use the training data 630 to train the recurrent neural network parameters 612.

Embodiments of the described techniques may be implemented on any suitable computer or computing system. For example, a method as described may be configured for implementation on dense matrix multiply-accumulate hardware or a dense matrix processing systolic array. This may be done where the recurrent neural network is a sparse recurrent neural network such that a parameter matrix with elements defining for each dimension of the current hidden state, the network parameters directly influencing the dimensions, is a sparse matrix, for example with a sparsity of 90% or more. In this case the method uses a dense version $\tilde{J}_t$ of the Jacobian matrix comprising a version of the Jacobian matrix in which columns or rows of all zero values are removed. The SnAp approximation techniques described herein may be used to impose additional sparsity on $\tilde{J}_t-1$.

Alternatively, a training method as described may be implemented using tensor processing hardware, with the method comprising receiving the training data in a first processor; and using the tensor processing hardware to determine the gradient of the optimization function by controlling the tensor processing hardware to determine the matrix product of the dynamics Jacobian matrix for the time step and the Jacobian matrix for the previous time step according to any embodiment described herein to impose sparsity.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method of training a recurrent neural network using forward propagation, the recurrent neural network having a plurality of network parameters and being configured to use hidden state units from a previous time step in computing hidden state units at a current time step, the method comprising:

receiving training data at each of a sequence of time steps and, for a succession of the time steps:
determining, using the training data received at the time step, a dynamics Jacobian matrix for the time step, wherein the dynamics Jacobian matrix defines a derivative of a current hidden state of the recurrent neural network with respect to a previous hidden state of the recurrent neural network from a previous time step;
applying a sparsity mask to a Jacobian matrix for the previous time step to generate a sparsified Jacobian matrix for the previous time step, wherein the Jacobian matrix for the previous time step defines a derivative of the previous hidden state of the recurrent neural network with respect to the network parameters, wherein:

each element of the Jacobian matrix for the previous time step corresponds to a respective hidden state unit of the previous hidden state and to a respective network parameter of the recurrent neural network, each element defines a derivative of the corresponding hidden state unit of the previous hidden state with respect to the corresponding network parameter, and the sparsity mask includes a corresponding element for each element of the Jacobian matrix for the preceding time step that is non-zero when a change in the corresponding network parameter would change a value of the corresponding hidden state unit after a single time step of recurrent processing by the recurrent neural network;

determining a Jacobian matrix for the time step by computing a product between the dynamics Jacobian matrix for the time step and the sparsified Jacobian matrix for the previous time step, wherein the Jacobian matrix for the time step defines a derivative of the current hidden state of the recurrent neural network with respect to the network parameters, wherein elements of the Jacobian matrix for the time step each define a derivative of a corresponding dimension of the current hidden state with respect to a corresponding one of the network parameters;

determining a gradient of an optimization function with respect to the network parameters from the Jacobian matrix for the time step; and adjusting the network parameters dependent on the gradient of the optimization function.

2. A method as claimed in claim 1 wherein determining the product of the dynamics Jacobian matrix for the time step and the Jacobian matrix for the previous time step comprises performing a sparse matrix multiply.

3. A method as claimed in claim 1 wherein the corresponding element for each element of the Jacobian matrix for the preceding time step is non-zero when a change in the corresponding network parameter would change a value of the corresponding hidden state unit after no more than two time steps of recurrent processing by the recurrent neural network.

4. A method as claimed in claim 1 wherein the corresponding element for each element of the Jacobian matrix for the preceding time step is non-zero when a change in the corresponding network parameter would change a value of the corresponding hidden state unit after no more than N time steps of recurrent processing by the recurrent neural network where N is greater than 2.

5. A method as claimed in claim 1, further comprising:

imposing sparsity on the Jacobian matrix for the time step, and wherein imposing sparsity on the Jacobian matrix for the time step comprises retaining only elements of the Jacobian matrix for the time step which have one of the top M values.

6. A method as claimed in claim 1, wherein determining the Jacobian matrix for the time step further comprises adding an immediate Jacobian matrix for the time step to the product of the dynamics Jacobian matrix for the time step and the Jacobian matrix for the previous time step, wherein the immediate Jacobian matrix for the time step comprises elements which each define a derivative of a dimension of the current hidden state with respect to a current value of one of the network parameters.

7. A method as claimed in claim 6 wherein elements of the Jacobian matrix for the time step each define a derivative of a dimension of the current hidden state with respect to one of the network parameters, wherein the corresponding element for each element of the Jacobian matrix for the preceding time step is non-zero when a change in the corresponding network parameter would change a value of the corresponding hidden state unit after a single time step of recurrent processing by the recurrent neural network, and wherein the sparsity mask retains an element of $J_{t-1}$ only if the corresponding element in the immediate Jacobian matrix is non-zero.

8. A method as claimed in claim 1, wherein determining the gradient of the optimization function with respect to the network parameters further comprises determining a product of the Jacobian matrix for the time step and a gradient of the optimization function with respect to the current hidden state of the recurrent neural network.

9. A method as claimed in claim 1, wherein the dynamics Jacobian matrix is a sparse matrix.

10. A method as claimed in claim 9 further comprising forming the Jacobian matrix for each time step to exclude rows or columns with zero value, where a row or column with zero value is defined by the sparse dynamics Jacobian matrix.

11. A method as claimed in claim 1 and configured for implementation on dense matrix multiply-accumulate hardware or a dense matrix processing systolic array, wherein the recurrent neural network is a sparse recurrent neural network such that a parameter matrix is a sparse matrix with a sparsity of 90% or more, wherein the parameter matrix has elements defining, for each dimension of the current hidden state, the network parameters directly influencing the dimensions, and wherein the method uses a dense version of the Jacobian matrix for the time step comprising a version of the Jacobian matrix for the time step in which columns or rows of all zero values are removed.

12. A method as claimed in claim 1 and configured for implementation in tensor processing hardware, the method comprising:

receiving the training data in a first processor; and using the tensor processing hardware to determine the gradient of the optimization function by controlling the tensor processing hardware to determine the matrix product of the dynamics Jacobian matrix for the time step and the Jacobian matrix for the previous time step.

13. A method as claimed in claim 1 wherein the training data comprises a sequence of image pixel data or a sequence of audio data defining a sound.

14. One or more non-transitory computer-readable storage media storing instructions that when executed by one or more computers cause the one or more computers to perform operations for of training a recurrent neural network using forward propagation, the recurrent neural network having a plurality of network parameters and being configured to use hidden state units from a previous time step in computing hidden state units at a current time step, the operations comprising:

receiving training data at each of a sequence of time steps and, for a succession of the time steps:

determining, using the training data received at the time step, a dynamics Jacobian matrix for the time step, wherein the dynamics Jacobian matrix defines a derivative of a current hidden state of the recurrent neural network with respect to a previous hidden state of the recurrent neural network from a previous time step;

applying a sparsity mask to a Jacobian matrix for the previous time step to generate a sparsified Jacobian matrix for the previous time step, wherein the Jacobian matrix for the previous time step defines a derivative of the previous hidden state of the recurrent neural network with respect to the network parameters, wherein:

each element of the Jacobian matrix for the previous time step corresponds to a respective hidden state unit of the previous hidden state and to a respective network parameter of the recurrent neural network, each element defines a derivative of the corresponding hidden state unit of the previous hidden state with respect to the corresponding network parameter, and the sparsity mask includes a corresponding element for each element of the Jacobian matrix for the preceding time step that is non-zero when a change in the corresponding network parameter would change a value of the corresponding hidden state unit after a single time step of recurrent processing by the recurrent neural network;

determining a Jacobian matrix for the time step by computing a product between the dynamics Jacobian matrix for the time step and the sparsified Jacobian matrix for the previous time step, wherein the Jacobian matrix for the time step defines a derivative of the current hidden state of the recurrent neural network with respect to the network parameters, wherein elements of the Jacobian matrix for the time step each define a derivative of a corresponding dimension of the current hidden state with respect to a corresponding one of the network parameters;

determining a gradient of an optimization function with respect to the network parameters from the Jacobian matrix for the time step; and adjusting the network parameters dependent on the gradient of the optimization function.

15. A system comprising one or more computers and one or more storage devices storing instructions that when executed by the one or more computers cause the one or more computers to perform operations for training a recurrent neural network using forward propagation, the recurrent neural network having a plurality of network parameters and being configured to use hidden state units from a previous time step in computing hidden state units at a current time step, the operations comprising:

receiving training data at each of a sequence of time steps and, for a succession of the time steps:

determining, using the training data received at the time step, a dynamics Jacobian matrix for the time step, wherein the dynamics Jacobian matrix defines a derivative of a current hidden state of the recurrent neural network with respect to a previous hidden state of the recurrent neural network from a previous time step;

applying a sparsity mask to a Jacobian matrix for the previous time step to generate a sparsified Jacobian matrix for the previous time step, wherein the Jacobian matrix for the previous time step defines a derivative of the previous hidden state of the recurrent neural network with respect to the network parameters, wherein:

each element of the Jacobian matrix for the previous time step corresponds to a respective hidden state unit of the previous hidden state and to a respective network parameter of the recurrent neural network, each element defines a derivative of the corresponding hidden state unit of the previous hidden state with respect to the corresponding network parameter, and the sparsity mask includes a corresponding element for each element of the Jacobian matrix for the preceding time step that is non-zero when a change in the corresponding network parameter would change a value of the corresponding hidden state unit after a single time step of recurrent processing by the recurrent neural network;

determining a Jacobian matrix for the time step by computing a product between the dynamics Jacobian matrix for the time step and the sparsified Jacobian matrix for the previous time step, wherein the Jacobian matrix for the time step defines a derivative of the current hidden state of the recurrent neural network with respect to the network parameters, wherein elements of the Jacobian matrix for the time step each define a derivative of a corresponding dimension of the current hidden state with respect to a corresponding one of the network parameters;

determining a gradient of an optimization function with respect to the network parameters from the Jacobian matrix for the time step; and adjusting the network parameters dependent on the gradient of the optimization function.

16. A system as claimed in claim 15, wherein determining the Jacobian matrix for the time step further comprises adding an immediate Jacobian matrix for the time step to the product of the dynamics Jacobian matrix for the time step and the Jacobian matrix for the previous time step, wherein the immediate Jacobian matrix for the time step comprises elements which each define a derivative of a dimension of the current hidden state with respect to a current value of one of the network parameters.

17. A system as claimed in claim 16, wherein elements of the Jacobian matrix for the time step each define a derivative of a dimension of the current hidden state with respect to one of the network parameters, wherein the corresponding element for each element of the Jacobian matrix for the preceding time step is non-zero when a change in the corresponding network parameter would change a value of the corresponding hidden state unit after a single time step of recurrent processing by the recurrent neural network, and wherein the sparsity mask retains an element of $J_{t-1}$ only if the corresponding element in the immediate Jacobian matrix is non-zero.

* * * * *